(12) United States Patent
Liang et al.

(10) Patent No.: US 11,476,469 B2
(45) Date of Patent: Oct. 18, 2022

(54) NEGATIVE CURRENT COLLECTOR, NEGATIVE ELECTRODE PLATE, ELECTROCHEMICAL DEVICE, AND APPARATUS

(71) Applicant: Contemporary Amperex Technology Co., Limited, Ningde (CN)

(72) Inventors: Chengdu Liang, Ningde (CN); Xin Liu, Ningde (CN); Qisen Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/128,124

(22) Filed: Dec. 20, 2020

(65) Prior Publication Data

US 2021/0151771 A1   May 20, 2021

Related U.S. Application Data

(63) Continuation of application No. PCT/CN2020/070453, filed on Jan. 6, 2020.

(30) Foreign Application Priority Data

Apr. 28, 2019  (CN) .......................... 201910350620.0

(51) Int. Cl.
*H01M 4/00* (2006.01)
*H01M 4/66* (2006.01)
(Continued)

(52) U.S. Cl.
CPC .......... *H01M 4/667* (2013.01); *H01M 4/131* (2013.01); *H01M 4/525* (2013.01); *H01M 4/661* (2013.01);
(Continued)

(58) Field of Classification Search
CPC ........ H01M 4/667; H01M 4/70; H01M 4/131; H01M 4/668; H01M 10/058; H01M 4/661; H01M 4/525; H01M 4/366
See application file for complete search history.

(56) References Cited

U.S. PATENT DOCUMENTS

| 2004/0126663 A1 | 7/2004 | Sudano et al. |
| 2013/0011742 A1 | 1/2013 | Park et al. |

(Continued)

FOREIGN PATENT DOCUMENTS

| CN | 102618097 A | 8/2012 |
| CN | 106981665 A | 7/2017 |

(Continued)

OTHER PUBLICATIONS

Machine translation of JP 2004-273132, obtained Jun. 3, 2021 (Year: 2004).*

(Continued)

*Primary Examiner* — Nicholas P D'Aniello

(57) ABSTRACT

The present disclosure provides a negative current collector (10), a negative electrode plate (20), an electrochemical device, and an apparatus. The negative current collector (10) includes a support layer, and a conductive layer (102) disposed on at least one of two opposite surfaces of the support layer (101) in a thickness direction of the support layer; wherein the support layer (101) has a smaller density than the conductive layer (102); the conductive layer (102) has a thickness $D_1$ satisfying 300 nm≤$D_1$≤2 μm, preferably 500 nm≤$D_1$≤1.5 μm; and when the negative current collector (10) has a tensile strain of 1.5%, the conductive layer (102) has a sheet resistance growth rate T satisfying T≤5%.

15 Claims, 5 Drawing Sheets

(51) Int. Cl.
*H01M 4/131* (2010.01)
*H01M 4/525* (2010.01)
*H01M 4/70* (2006.01)
*H01M 10/058* (2010.01)

(52) U.S. Cl.
CPC ............. *H01M 4/668* (2013.01); *H01M 4/70* (2013.01); *H01M 10/058* (2013.01)

(56) References Cited

U.S. PATENT DOCUMENTS

| | | |
|---|---|---|
| 2018/0198132 A1 | 7/2018 | Liang et al. |
| 2018/0301709 A1* | 10/2018 | Qiu .................. C23C 14/205 |
| 2019/0058198 A1 | 2/2019 | Fan et al. |

FOREIGN PATENT DOCUMENTS

| | | |
|---|---|---|
| CN | 107221676 A | 9/2017 |
| CN | 108281662 A | 7/2018 |
| CN | 108832134 A | 11/2018 |
| EP | 3367485 | 8/2018 |
| EP | 3624240 A1 | 3/2020 |
| JP | 2003031224 A | 1/2003 |
| JP | 2004273132 A | 9/2004 |
| JP | 2006-512722 A | 4/2006 |
| JP | 2011060560 A | 3/2011 |
| JP | 2016018653 A | 2/2016 |
| WO | 2012/127561 A1 | 9/2012 |
| WO | 2013047432 A1 | 4/2013 |
| WO | 2016031690 | 3/2016 |

OTHER PUBLICATIONS

First Office Action in Chinese Application No. 201910350620.0, dated Aug. 26, 2020.
International Search Report for PCT/CN2020/070453, dated Apr. 3, 2020, 18 pages.
Office Action for Japanese Patent Application No. 2019-192005, dated Dec. 1, 2020, 4 pages.
The extended European search report dated Sep. 6, 2021 for European Application No. 20799021.9 13 pages.
Office Action issued by Government of India for related Application No. 202017054948, dated Apr. 8, 2022.
Request for the Submission of an Opinion for Korean Patent Application No. 10-2020-7034275, dated Jul. 6, 2022.

* cited by examiner

NEGATIVE CURRENT COLLECTOR, NEGATIVE ELECTRODE PLATE, ELECTROCHEMICAL DEVICE, AND APPARATUS

CROSS-REFERENCE TO RELATED APPLICATIONS

This application is a continuation of International Application No. PCT/CN2020/070453, filed on Jan. 6, 2020, which claims priority to Chinese Patent Application No. 201910350620.0, filed on Apr. 28, 2019, both of which are hereby incorporated by reference in their entireties.

TECHNICAL FIELD

The present disclosure relates to the technical field of electrochemical device, and particularly, to a negative current collector, a negative electrode plate, an electrochemical device, and an apparatus.

BACKGROUND

Secondary batteries, represented by lithium ion secondary batteries, have been widely applied in electric vehicles and consumer electronic products due to their advantages of high energy density, high output power, long cycle life, low environmental pollution, and the like. With the increasingly expanding application range of secondary batteries, higher requirements are raised on the energy density of the secondary batteries. Therefore, an urgent technical problem is to further improve the energy density of the secondary battery

SUMMARY

The inventors have found that the prior electrochemical devices such as secondary batteries normally employ metal current collectors having a large thickness such as 18 µm to 30 µm and a high density, in order to satisfy the demanding requirements for conductivity and current collection of the metal current collectors. However, the present inventors have further found that such metal current collectors may disadvantageously reduce the energy density of the batteries.

The present inventors have conducted a lot of research to improve the conventional current collectors, and to make the current collectors have good electrical conductivity and current collection performance with reduced weight, thereby providing an electrochemical device having a higher weight energy density and a good comprehensive electrochemical performance both.

A first aspect of the present disclosure provides a negative current collector, including: a support layer; and a conductive layer disposed on at least one of two opposite surfaces of the support layer in a thickness direction of the support layer wherein the support layer has a smaller density than the conductive layer; and wherein the conductive layer has a thickness $D_1$ satisfying 300 nm≤$D_1$≤2 µm, preferably 500 nm≤$D_1$≤1.5 µm, and wherein when the negative current collector has a tensile strain of 1.5%, the conductive layer has a sheet resistance growth rate T satisfying T≤5%, preferably T≤2.5%.

A second aspect of the present disclosure provides a negative electrode plate, including a negative current collector and a negative active material layer disposed on the negative current collector, wherein the negative current collector is the negative current collector according to the first aspect of the present disclosure.

A third aspect of the present disclosure provides an electrochemical device, including a positive electrode plate, a negative electrode plate, and an electrolyte, wherein the negative current plate is the negative current plate according to the second aspect of the present disclosure.

A fourth aspect of the present disclosure provides an apparatus including the electrochemical device according to the third aspect of the present disclosure.

The negative current collector according to the present disclosure including the support layer having a smaller density and the conductive layer having a reduced thickness, thus has a significantly reduced weight, compared with the existing metal current collectors, thereby obtaining an electrochemical device having significantly increased weight energy density. Further, when the negative current collector has a tensile strain of 1.5%, the sheet resistance growth rate T of the conductive layer satisfies T≤5%, a sharp increase in the resistance of the conductive layer having a smaller thickness, which is caused by a tensile deformation, can be prevented, thereby ensuring that the negative current collector can maintain good conductive and current collecting performances during further processing and electrochemical device application. The negative current collector or the negative plate provided by the present disclosure enables the electrochemical device containing the same to have a reduced resistance and low negative polarization. In this way, the electrochemical device has good electrochemical performances such as rate performance, cycle performance, dynamic performance, and the like. Therefore, by using the negative current collector or the negative plate according to the present disclosure, the electrochemical device provided by the present disclosure can have high weight energy density and good overall electrochemical performance both.

The apparatus according to the present disclosure includes the electrochemical device according to the present disclosure, and thus at least has the same advantage as the electrochemical device.

BRIEF DESCRIPTION OF DRAWINGS

In order to clearly illustrate technical solutions of embodiments of the present disclosure, drawings used in the embodiments of the present disclosure will be briefly described below, and those skilled in the related art can also obtain other drawings on basis of these drawings without any creative labor.

DESCRIPTION OF EMBODIMENTS

In order to clearly explain the purposes, the technical solutions and the beneficial technical effects of the present disclosure, the present disclosure will be described in detail below with reference to the embodiments. It should be understood that the embodiments described herein are merely used to illustrate the present disclosure, but not intended to limit the present disclosure.

For the sake of brevity, the present disclosure explicitly describes some numerical ranges. However, any lower limit can be combined with any upper limit as an unspecified range; any lower limit can be combined with any other lower limit as an unspecified range, and any upper limit can be combined with any other upper limit as an unspecified range. Further, although not explicitly described, each point or single value between endpoints of a range is included in the range. Thus, each point or single value, as a lower limit or an upper limit, can be combined with any other point or single value or combined with any other lower or upper limit to form an unspecified range.

In the description herein, it should be noted that, unless otherwise stated, the recitation of numerical ranges by "above" and "below" include all numbers within that range including the endpoints. As used herein, "a", "an", "the", "at least one", and "one or more" are used interchangeably, unless indicated otherwise and the recitation of "more" in the phrase "one or more" includes two or more.

The above is not intended to describe all disclosed embodiments or implementations. The exemplary embodiments are described in details as below. Throughout the present disclosure, a series of embodiments provide a guidance such that these embodiments can be used in various combinations. In the present disclosure, merely the representative embodiments are presented and should not be construed as to be exhaustive.

Negative Current Collector

A first aspect of the present disclosure provides a negative current collector, compared with the conventional negative current collector made of a metal current foil, which has lower weight and better conductive and current collecting performances both.

Figure 1:
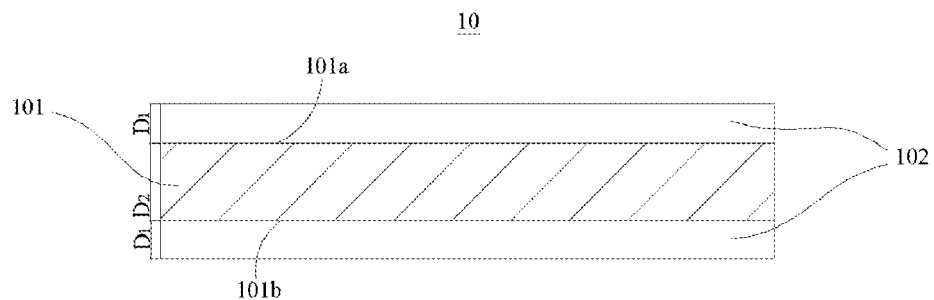
FIG. 1 is a structural schematic diagram of a negative current collector according to an embodiment of the present disclosure.

As an example, FIG. 1 illustratively shows a negative current collector 10. Referring to FIG. 1, the negative current collector 10 includes a support layer 101 and conductive layers 102 that are stacked in which the support layer 101 has a first surface 101$a$ and a second surface 101$b$ that are opposite to each other in a thickness direction thereof and the conductive layers 102 are laminated on the first surface 101$a$ and the second surface 101$b$ of the support layer 101.

Figure 2:
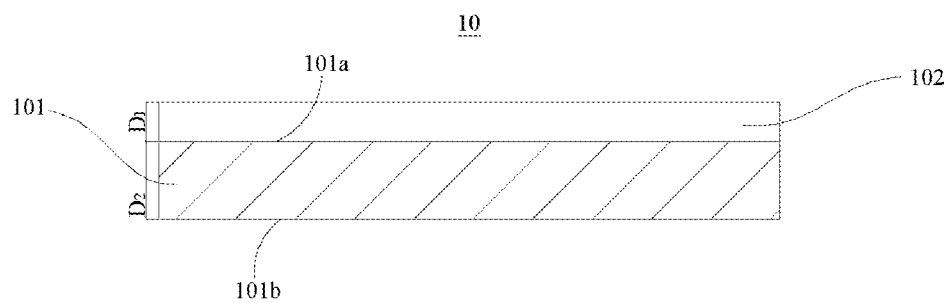
FIG. 2 is a structural schematic diagram of a negative current collector according to another embodiment of the present disclosure.

As another example, FIG. 2 illustratively shows another negative current collector 10. Referring to FIG. 2, the negative current collector includes a support layer 101 and a conductive layer 102 that are stacked in which the support layer 101 has a first surface 101$a$ and a second surface 101$b$ that are opposite to each other in a thickness direction thereof and the conductive layer 102 is laminated on the first surface 101$a$ of the support layer 101. The conductive layer 102 can also be laminated on the second surface 101$b$ of the support layer 101.

In the negative current collector according to the present disclosure, the support layer 101 has a smaller density than the conductive layer 102; and the conductive layer 102 has a thickness $D_1$ satisfying 300 nm $\leq D_1 \leq$ 2 μm.

The negative current collector 10 according to embodiments of the present disclosure includes a support layer 101 having a reduced density, and a conductive layer 102 having a reduced thickness that is disposed on any one of the first surface 101$a$ and the second surface 101$b$. Thus, the negative current collector 10 itself has a significantly reduced weight, thereby achieving an electrochemical device having a significantly improved weight energy density.

Further, when the negative current collector 10 has a tensile strain of 1.5%, the conductive layer 102 has a sheet resistance growth rate T satisfying T≤5%. The negative current collector 10 may be stretched during the processing of a negative electrode plate and application of an electrochemical device, such as rolling or electrode plate expansion, and thus a tensile strain may be generated. By setting the sheet resistance growth rate T of the conductive layer 102 to be 0.5% or less when the negative current collector 10 has a tensile strain of 1.5%, a sharp increase in the resistance of the conductive layer 102 having a smaller thickness, which is caused by a tensile deformation, can be effectively prevented, thereby ensuring that the negative current collector 10 can have a good conductive and current collecting performances during further processing and application of the electrochemical device. Such a negative current collector 10 allows the obtained electrochemical device to have reduced resistance and negative polarization while having good overall electrochemical performance such as rate performance, cycle performance, and dynamic performance.

Therefore, by adopting the negative current collector 10 according to the present disclosure, the electrochemical device can have high weight energy density and good overall electrochemical performance both.

Preferably, when the negative current collector 10 has a tensile strain of 1.5%, the sheet resistance growth rate T of the conductive layer 102 satisfies T≤2.5%.

In the present disclosure, the tensile strain E of the negative current collector 10 can be calculated according to the formula $\varepsilon = \Delta L/L \times 100\%$, where $\Delta L$ is the elongation of the negative current collector 10 after stretching, and L is the original length of the negative current collector 10, i.e., the length prior to stretching.

The sheet resistance growth rate T of the conductive layer 102 when the negative current collector 10 has a tensile strain of 1.5%, can be measured by a method known in the related art. For example, the negative current collector 10 is cut into a sample of 20 mm width×200 mm long in which an initial position is set so that a 50 mm long area centered on the midpoint of the sample is considered to be a central region. The sheet resistance of the sample at the central region is tested by using a four-probe method, and recorded as $R_1$, and then the central region of the sample is stretched by using a tensile machine such as Instron 3365 tensile machine (Instron, USA) in which the central region is clamped between clamps, and the sample is stretched with a speed of 50 mm/min. When a stretching distance reaches 1.5% of the original length of the central region, i.e. the stretching distance is 0.75 mm, the stretching is stopped; and then the sample is taken off, and the sheet resistance of the conductive layer 102 at the stretched central region is recorded as $R_2$. According to the formula of $T=(R_2-R_1)/R_1\times 100\%$, the sheet resistance growth rate T of the conductive layer 102 when the negative current collector 10 has a tensile strain of 1.5% is obtained by calculation.

For example, the four-probe method for testing the sheet resistance of the sample is performed as follows: using RTS-9 type double electric measuring four-probes tester, the test environment is: room temperature 23±2° C., normal pressure of 0.1 MPa, and relative humidity ≤65%. During the test, the sample is surface cleaned, then placed horizontally on a test board, the four probes are placed to be in good contact with the sample surface, a current range of the sample is calibrated in an automatic test mode, and then at an appropriate current range, the sheet resistance is measured. Eight to ten data points of the same sample are collected for measurement accuracy and error analysis and the average is recorded as the sheet resistance of the sample.

In some embodiments, the support layer 101 has a thickness $D_2$ that satisfies 1 μm≤$D_2$≤20 μm. The support layer 101 having the above-mentioned thickness $D_2$ enables the support layer 101 to have sufficient mechanical strength, and not to easily break during processing and application. The support layer 101 provides good support and protection for the conductive layer 102, makes sure that the negative current collector 10 has good mechanical stability and operating stability and enables the negative current collector 10 to have a relatively long service life. In addition, the support layer 101 having the suitable thickness is conducive to reducing the volume and weight of the electrochemical device, thereby increasing the energy density of the electrochemical device.

In some embodiments, the thickness $D_2$ of the support layer 101 can be 20 μm or less, 18 μm or less, 15 μm or less, 12 μm or less, 10 μm or less, or 8 μm or less, and the thickness $D_2$ of the support layer 101 can be 1 μm or more, 1.5 μm or more, 2 μm or more, 3 μm or more, 4 μm or more, 5 μm or more, 6 μm or more, or 7 μm or more. In an embodiment, the thickness $D_2$ of the support layer 101 is 1 μm≤$D_2$≤15 μm, further preferably 2 μm≤$D_2$≤10 μm, and more preferably 2 μm≤$D_2$≤6 μm.

The thickness $D_2$ of the support layer 101 satisfying the above ranges enables the negative current collector 10 to have good mechanical and operating stability while minimizing the total weight of negative current collector 10 as much as possible.

In a preferred embodiment, the conductive layer 101 has a volume resistivity of $1.0\times 10^{-5}$ Ω·m or more. Since the volume resistivity of the support layer 101 is larger, the short circuit resistance at which the internal short circuit of the electrochemical device occurs will increase in an abnormal situation such as nailing, thereby improving the safety performance of the electrochemical device.

In the present disclosure, the volume resistivity of the support layer 101 is a volume resistivity at 20° C., which can be measured by a method known in the related art. For example, the measurement is carried out at constant temperature, normal pressure and low pressure humidity (20° C., 0.1 MPa, RH≤20%) and a round sample of the support layer 101 having a diameter of 20 mm is prepared (the sample size can be adjusted according to the actual size of the measurement instrument). The measurement is carried out by using a three-electrode surface resistivity method (GB T 1410-2006) with an insulation resistance tester having an accuracy of 10Ω. The test method is performed as follows: the round sample is placed between two electrodes, and a potential difference is applied between the two electrodes, and the generated current will be distributed within the round sample and measured by a picoammeter or an electrometer to avoid measurement errors caused by currents leaking to the surface during the measurement. The reading is the volume resistivity in units of Ω·m.

In some embodiments, the support layer 101 has an elongation at break that is greater than or equal to that of the conductive layer 102, thereby preventing the negative current collector 10 from breaking. Optionally, the elongation at break of the support layer 101 is greater than or equal to 5%, and preferably, the elongation at break of the support layer 101 is greater than or equal to 10%.

The elongation at break can be measured by a method known in the related art. For example, the support layer 101 is cut into a sample of 15 mm×200 mm, and then subjected to a stretching test by using a tensile machine (such as Instron 3365 tensile machine) at room temperature and normal pressure (25° C., 0.1 MPa). An initial position is set in such manner that a length of the sample between the clamps is 50 mm, the tensile speed is 50 mm/min, the equipment displacement y (mm) at the time of tensile fracture is recorded, and the elongation at break is calculated according to (y/50)×100%. The elongation at break of the conductive layer 102 can be conveniently measured by the same method.

In some preferred embodiments, the support layer 101 has a Young's modulus E satisfying E≥4 GPa. The support layer 101 having the above mentioned Young's modulus E enables the support layer to have sufficient rigidity so as to achieve a supporting effect of the support layer 101 on the conductive layer 102, and makes sure that the negative current collector 10 has sufficient overall strength. During the processing of the negative current collector 10, the support layer 101 does not undergo excessive stretching or deformation. Thus, the support layer 101 having the appropriate Young's modulus E is unlikely to be broken, and the bonding between the support layer 101 and the conductive layer 102 can be strengthened to avoid the detachment, thereby ensuring that the negative current collector 10 has high mechanical stability and operating stability. The negative current collector 10 allows the electrochemical device to have high electrochemical performance, such as a long cycle life.

More preferably, the Young's modulus E of the support layer 101 satisfies 4 GPa≤E≤20 GPa such that the support layer 101 has a certain rigidity and a certain deformation resistance both. In this way, the support layer 101 has a flexibility of winding during the processing and application so that the breakage may be prevented well.

The Young's modulus E of the support layer 101 can be determined by a method known in the related art. As an example, the support layer 101 is cut into a sample of 15 mm×200 mm, and the thickness h (μm) of the sample is measured by a micrometer, and a tensile test is performed by using a tensile machine (such as Instron 3365 tensile machine) at room temperature and normal pressure (25° C., 0.1 MPa). An initial position is set in such manner that the sample between the clamps has a length of 50 mm. The tensile speed is 50 mm/min. The load L (N) and the apparatus displacement y (mm) at the time of tensile fracture are recorded, then a stress-strain curve is drawn according to stress ε (GPa)=L/(15×h) and strain η=y/50 in which the slope of the initial linear zone in the curve is the Young's modulus E.

Preferably, there is a bonding force F between the support layer 101 and the conductive layer 102 that satisfies F≥100 N/m, and more preferably F≥400 N/m. The support layer 101 and the conductive layer 102 are firmly bonded such that the support layer 101 can effectively support the conductive layer 102, thereby ensuring the operating stability of the negative current collector 10.

The bonding force F between the support layer 101 and the conductive layer 102 can be measured by a method known in the related art. For example, the negative current collector 10, in which the conductive layer 102 is disposed on one surface of the support layer 101, is a sample to be tested. The sample has a width d of 0.02 m. Under room temperature and normal pressure (25° C., 0.1 MPa), a 3M double-sided adhesive tape is evenly attached to a stainless steel plate, the sample is then evenly attached to the double-sided adhesive tape, and then the conductive layer 102 is continuously peeled off from the support layer 101 at 180° by using a tensile machine (such as Instron 3365 tensile machine) at a speed of 50 mm/min. The maximum tensile force x(N) is read according to the data diagram of the tensile force and the displacement, and the bonding force F (N/m) between the conductive layer 102 and the support layer 101 is calculated according to F=x/d.

In some embodiments, the support layer 101 includes one or more polymer materials. Since the polymer materials have significantly lower density, the weight of the negative current collector 10 can be significantly reduced, thereby increasing the weight energy density of the electrochemical device.

Preferably, the polymer material nay comprises one or more of polyamides, polyimides, polyesters, polyolefins, polyacetylenes, siloxane-based polymers, polyethers, polyalcohols, polysulfones, polysaccharides, amino acid-based polymers, polysulfurnitrides, aromatic cyclic polymers, aromatic heterocyclic polymers, epoxy resins, phenolic resins, derivatives thereof, crosslinks thereof, and copolymers thereof.

The polyamide may be selected from polycaprolactam (commonly known as nylon 6), polyhexamethylene adipamide (commonly known as nylon 66), polyparaphenylene terephthalamide (PPTA), or poly (m-phenylene isophthalamide) (PMIA). The polyester may be selected from polyethylene terephthalate (PET), polybutylene terephthalate (PBT), poly (ethylene naphthalate) (PEN), or polycarbonate (PC). The polyolefin may be selected from polyethylene (PE), polypropylene (PP), or poly (propylene ethylene) (PPE), polyvinyl alcohol (PVA), polystyrene (PS), polyvinyl chloride (PVC), polyvinylidene fluoride (PVDF), polytetrafluoroethylene (PTFE), or poly(sodium styrenesulfonate) (PSS). The polyacetylene is for example polyacetylene. The siloxane polymer is, for example, silicone rubber. The polyether may be selected from polyoxymethylene (POM), polyphenylene oxide (PPO), or polyphenylene sulfide (PPS). The polyalcohol may be selected from polyethylene glycol (PEG). The polysaccharide may be selected from cellulose, or starch. The amino acid-based polymer may be selected from protein. The aromatic cyclic polymer may be selected from polyphenylene, for example polyparaphenylene. The aromatic heterocyclic polymer may be selected from polypyrrole (PPy), polyaniline (PAN), polythiophene (PT), polypyridine (PPY). The copolymer is, for example, acrylonitrile-butadiene-styrene copolymer (ABS).

In some preferred embodiments, the support layer 101 can be made of one or more of insulating polymer materials. Thus, the support layer 101 has a higher volume resistivity, up to $1.0 \times 10^9$ Ω·m or higher, thereby improving the safety performance of the electrochemical device.

Preferably, the support layer 101 includes one or more of polyethylene terephthalate (PET), polybutylene terephthalate (PBT), polyethylene naphthalate (PEN), poly(sodium styrenesulfonate) (PSS), or polyimides (PI).

The support layer 101 can have a predetermined volume resistivity, elongation at break, and Young's modulus by adjusting the chemical composition, molecular weight and distribution, chain structure and chain construction, aggregate structure, phase structure, additives, and the like of the polymer material, for the purpose of improving the mechanical and electrochemical properties of the electrochemical device.

In some embodiments, the support layer 101 further includes an additive. The additive is added to adjust its volume resistivity, elongation at break, and Young's modulus. The additive may include one or more of metallic materials and inorganic non-metallic materials. The metallic material additive may be selected from one or more of aluminum, aluminum alloy, copper, copper alloy, nickel, nickel alloy, titanium, titanium alloy, iron, iron alloy, silver, silver alloy, and combinations thereof. The inorganic non-metallic material additive may be selected from one or more of carbon-based materials, alumina, silicon dioxide, silicon nitride, silicon carbide, boron nitride, silicate, titanium oxide, and combinations thereof, for example, one or more of glass materials, ceramic materials, or ceramic composite materials. The carbon-based material may be selected from one or more of graphite, superconducting carbon, acetylene black, carbon black, Ketjen black, carbon dots, carbon nanotube, graphene, carbon nanofiber, and combinations thereof.

In some embodiments, the additive may be a carbon-based material coated with metal, such as one or more of nickel-coated graphite powder and nickel-coated carbon fiber.

In the negative current collector 10 according to the embodiments of the present disclosure, the support layer 101 can have a single layer structure as shown in FIG. 1 and FIG. 2, or a composite layer structure having two or more layers, such as two layers, three layers, four layers, and the like.

Figure 3:
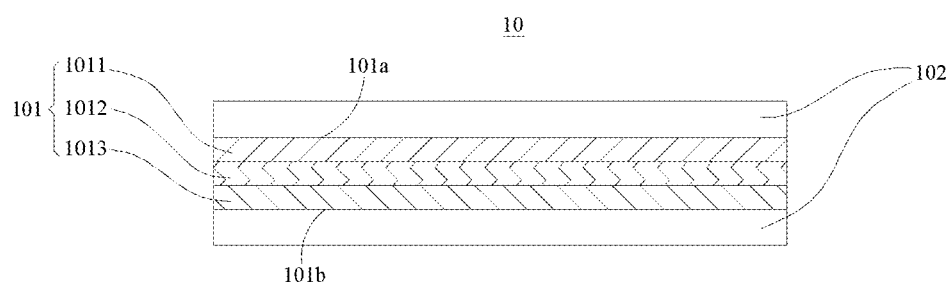
FIG. 3 is a structural schematic diagram of a negative current collector according to yet another embodiment of the present disclosure.

As an example, FIG. 3 illustrates a negative current collector 10 including a support layer 101 having a composite layer structure. Referring to FIG. 3, the support layer 101 has a composite layer structure formed by laminating a first sub-layer 1011, a second sub-layer 1012 and a third sub-layer 1013. The support layer 101 having the composite layer structure has a first surface 101a and a second surface 101b that are opposite to each other, and the conductive layers 102 are stacked on the first surface 101a and the second surface 101b of the support layer 101. It is also possible that the conductive layer 102 is disposed only on the first surface 101a or the second surface 101b of the support layer 101.

When the support layer 101 is in the composite layer structure having two or more layers, the two or more layers can be made of the same material or different materials.

In the negative current collector 10 according to the present disclosure, the conductive layer 102 has a thickness $D_1$ that satisfies 300 nm≤$D_1$≤2 μm. The thickness of the conductive layer 102 is much smaller than the thickness of the conventional metal copper foil current collector, and the density of the support layer 101 is smaller than that of the conductive layer 102, thereby significantly improving the weight energy density of the electrochemical device. The conductive layer 102 having such an appropriate thickness can also ensure that the negative current collector 10 has good conductive and current collecting performances, and thus the negative current collector 10 has good mechanical stability, operating stability and longer service life. Thus, the electrochemical device may have good electrochemical performances.

In some embodiments, the thickness $D_1$ of the conductive layer 102 can be 2 μm or less, 1.8 μm or less, 1.5 μm or less, 1.2 μm or less, 1 μm or less, or 900 nm or less; and the thickness $D_1$ of the conductive layer 102 can be 800 nm or more, 700 nm or more, 600 nm or more, 500 nm or more, 450 nm or more, 400 nm or more, 350 nm or more, or 300 nm or more. In some embodiments, the thickness $D_1$ of the conductive layer 102 satisfies 500 nm≤$D_1$≤1.5 μm, such that the negative current collector 10 can have high energy density and conductivity both.

In some preferred embodiments, the conductive layer 102 has a volume resistivity in a range of $1.3 \times 10^{-8}$ Ω·m to $1.3 \times 10^{-7}$ Ω·m. The conductive layer 102 having the above appropriate volume resistivity allows the negative current collector 10 to have good conductive and current collecting performances. In this way, adopting such a negative current collector 10 enables the electrochemical device to have low impedance and reduced negative electrode polarization, thereby enabling the electrochemical device to have high rate performance and cycle performance. Preferably, the volume resistivity of the conductive layer 102 is in a range of $1.3 \times 10^{-8}$ Ω·m to $3.3 \times 10^{-8}$ Ω·m, more preferably $1.65 \times 10^{-8}$ Ω·m to $3.3 \times 10^{-8}$ Ω·m.

In the present disclosure, the volume resistivity ρ of the conductive layer 102 satisfies $\rho = R_S \times d$, where ρ is in units of Ω·m; $R_S$ is the sheet resistance of the conductive layer 102 in units of Ω; and d represents the thickness of the conductive layer 102 in units of meter. For example, the sheet resistance $R_S$ of the conductive layer 102 can be measured by the four-probe method with a RTS-9 type double electric four-probe tester. The test environment is: room temperature 23±2° C., normal pressure of 0.1 MPa, relative humidity ≤65%. During the test, the sample of the negative current collector 10 is surface cleaned, then placed horizontally on a test board, the probes are placed to be in good contact with the surface of the conductive layer 102 of the sample, a current range of the sample is calibrated in an automatic test mode, and then at an appropriate current range, the sheet resistance is measured. Eight to ten data points of the same sample are collected for measurement accuracy and error analysis, and the average is recorded as the sheet resistance of the conductive layer 102.

In some embodiments, the conductive layer 102 includes a metallic material. The metallic material may include one or more of copper, copper alloy, nickel, nickel alloy, titanium, titanium alloy, silver, or silver alloy, preferably one or more of copper, copper alloy, nickel, nickel alloy, titanium, or silver. The above copper alloy contains over 90 wt % of copper element. The nickel alloy may include nickel-copper alloy.

In some embodiments, the conductive layer 102 is a metal conductive layer.

In other embodiments, the conductive layer 102 can further include one or more of a carbon-based conductive material and a conductive polymer material. The one or more of the carbon-based conductive material and the conductive polymer material is present in a weight percentage of 10 wt % or less in the conductive layer 102.

The above carbon-based conductive material may include one or more of graphite, superconductive carbon, acetylene black, carbon black, ketjen black, carbon dots, carbon nanotubes, graphene, or carbon nanofiber.

The conductive polymer material may include one or more of polysulfide nitride, an aliphatic conjugated polymer, an aromatic cyclic conjugated polymer, and an aromatic heterocyclic conjugated polymer. The aliphatic conjugated polymer is, for example, polyacetylene; the aromatic cyclic conjugated polymer is, for example, polyphenylene such as polyparaphenylene, or polynaphthalene; and the aromatic heterocyclic conjugated polymer is, for example, polypyrrole, polyaniline, polythiophene, or polypyridine. It is also possible to improve the electrical conductivity of the conductive polymer material by doping modification.

In some embodiments, the negative current collector 10 may further include a protective layer 103. The protective layer 103 may be disposed between the conductive layer 102 and the support layer 101. Alternatively, the protective layer 103 may be disposed on the surface of the conductive layer 102 facing away from the support layer 101. Alternatively, the protective layer may be provided between the conductive layer 102 and the support layer 101 as well as on the surface of the conductive layer 102 facing away from the support layer 101. The protective layer can protect the conductive layer 102 from chemical corrosion, mechanical damage, or other damage. In this way, the negative current collector 10 can have higher operating stability and prolonged service life, thereby improving the electrochemical performance of the electrochemical device. In addition, the protective layer 103 can also enhance the mechanical strength of the negative current collector 10.

In some embodiment, the protective layer 103 may include one or more of a metallic material, a metal oxide material, or a conductive carbon material.

The metallic material used for the protective layer may include one or more of nickel, chromium, a nickel-based alloy, or a copper-based alloy. The nickel-based alloy is an alloy formed by incorporating one or more other elements into pure nickel as a matrix, and nickel-chromium alloy is preferred. The nickel-chromium alloy is an alloy of metal nickel and metal chromium. Optionally, the nickel-chromium alloy has a weight ratio of nickel to chromium of 1:99 to 99:1, such as 9:1. The copper-based alloy is an alloy formed by incorporating one or more other elements into pure copper as a matrix, and nickel-copper alloy is preferred. Optionally, the nickel-copper alloy has a weight ratio of nickel to copper of 1:99 to 99:1, such as 9:1.

The metal oxide used for the protective layer may include one or more of aluminum oxide, cobalt oxide, chromium oxide, or nickel oxide.

The conductive carbon used for the protective layer may include one or more of graphite, superconductive carbon, acetylene black, carbon black, ketjen black, carbon dots, carbon nanotubes, graphene, or carbon nanofiber, preferably one or more of carbon black, carbon nanotubes, acetylene black, or grapheme.

In some embodiments, the protective layer is made of the metallic material, or the metal oxide material. That is, the metallic or metal oxide protective layer is disposed on the conductive layer 102. The metal protective layer and the metal oxide protective layer both have high corrosion resistance, high hardness, large specific surface area, and high overall performance.

Figure 4:
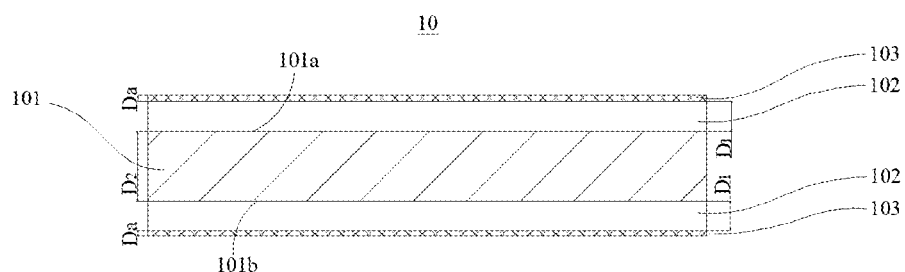
FIG. 4 is a structural schematic diagram of a negative current collector according to yet another embodiment of the present disclosure.
Figure 5:
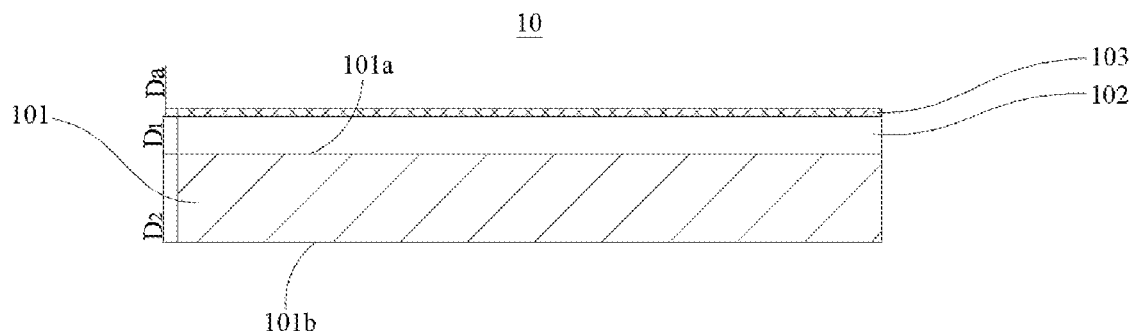
FIG. 5 is a structural schematic diagram of a negative current collector according to yet another embodiment of the present disclosure.

FIG. 4 and FIG. 5 illustrate some examples of the negative current collector 10 including the protective layer 103. Referring to FIG. 4 and FIG. 5, the negative current collector 10 includes the support layer 101, the conductive layer 102, and the protective layer 103 which are disposed in a stacked manner. The support layer 101 has the first surface 101a and the second surface 101b that are opposite to each other in the thickness direction of the support layer 101, and the conductive layer 102 is laminated on at least one of the first surface 101a and the second surface 101b of the support layer 101, and the protective layer 103 is laminated on the surface of the conductive layer 102 facing away from the support layer 101.

The protective layer 103 disposed on the surface of the conductive layer 102 facing away from the support layer 101, which is simply referred to as an upper protective layer, provides protective effects against chemical corrosion and mechanical damage for the conductive layer 102. The metallic or metal oxide protective layer can not only protect the conductive layer 102, but improve the interface between the negative current collector 10 and the negative active material layer, thereby increasing the bonding force between the negative current collector 10 and the negative active material layer.

Further, the upper protective layer is preferably a metal protective layer. The metal protective layer can reduce the interface resistance between the negative current collector 10 and the negative electrode active material. In this way, the polarization of the electrode plate can be reduced, and the electrochemical performance of the electrochemical device can be improved.

Figure 6:
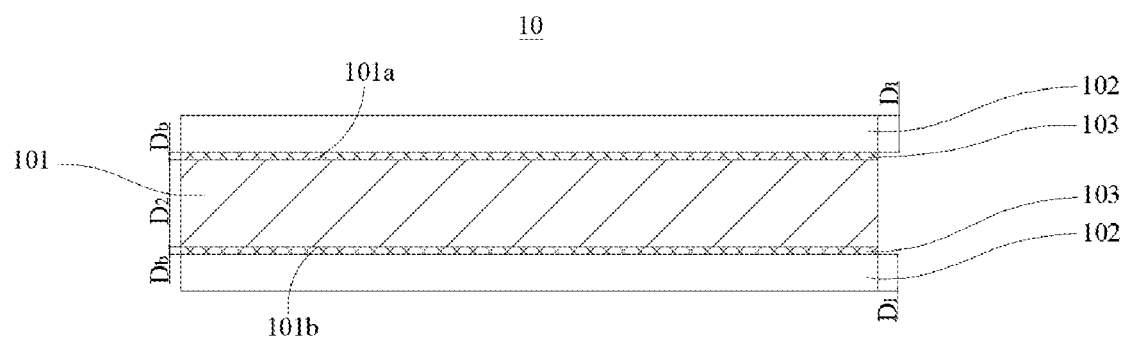
FIG. 6 is a structural schematic diagram of a negative current collector according to yet another embodiment of the present disclosure.
Figure 7:
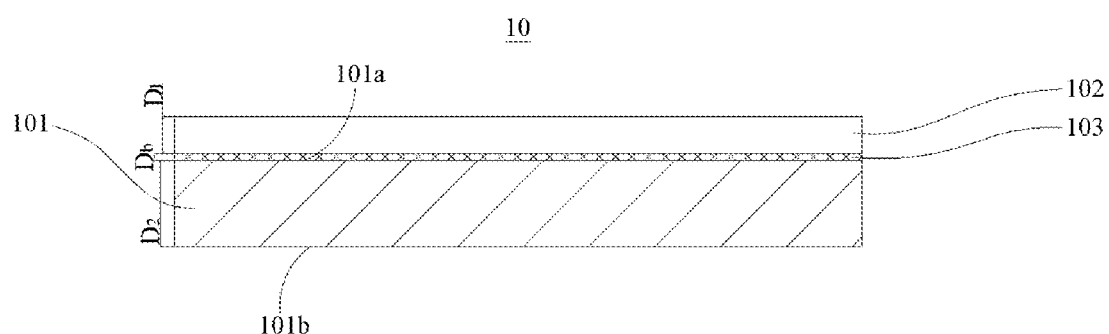
FIG. 7 is a structural schematic diagram of a negative current collector according to yet another embodiment of the present disclosure.

FIG. 6 and FIG. 7 illustrate some other examples of the negative current collector 10 including the protective layer 103. Referring to FIG. 6 and FIG. 7, the negative current collector 10 includes the support layer 101, the conductive layer 102, and the protective layer 103 which are disposed in a stacked manner. The support layer 101 has the first surface 101a and the second surface 101b that are opposite to each other in the thickness direction of the support layer 101, and the conductive layer 102 is laminated on at least one of the first surface 101a and the second surface 101b of the support layer 101, and the protective layer 103 is laminated between the conductive layer 102 and the support layer 101.

The protective layer 103 disposed between the conductive layer 102 and the support layer 101 is simply referred to as a lower protective layer. The lower protective layer has two opposite surfaces each connected to the conductive layer 102 and the support layer 101, respectively. In this way, the conductive layer 102 is provided with support effect, and protective effect against chemical corrosion and mechanical damage. In addition, the lower protective layer can also increase the bonding force between the support layer 101 and the conductive layer 102. Therefore, the lower protective layer is preferably a metallic or metal oxide protective layer.

Figure 8:
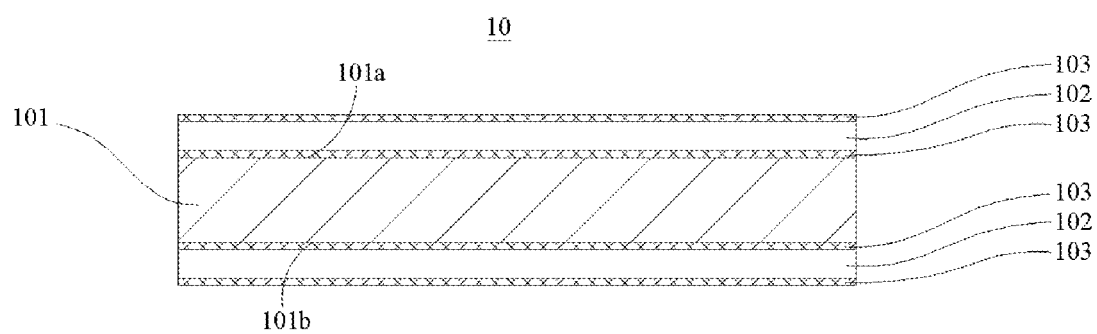
FIG. 8 is a structural schematic diagram of a negative current collector according to yet another embodiment of the present disclosure.
Figure 9:
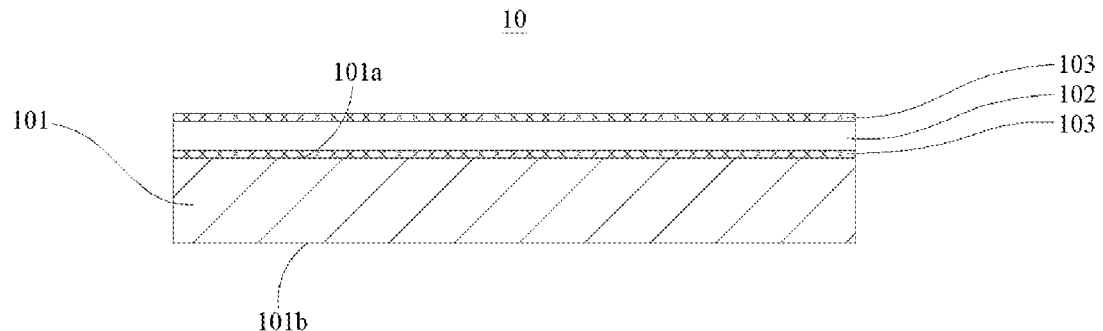
FIG. 9 is a structural schematic diagram of a negative current collector according to yet another embodiment of the present disclosure.

FIG. 8 and FIG. 9 illustrate some other examples of the negative current collector 10 including the protective layer 103. Referring to FIG. 8 and FIG. 9, the negative current collector 10 includes the support layer 101, the conductive layer 102, and the protective layers 103 which are disposed in a stacked manner. The support layer 101 has the first surface 101a and the second surface 101b that are opposite to each other in the thickness direction of the support layer 101, and the conductive layer 102 is laminated on at least one of the first surface 101a and the second surface 101b of the support layer 101, and the protective layers 103 are laminated between the conductive layer 102 and the support layer 101 and on the surface of the conductive layer 102 facing away from the support layer 101.

The conductive layer 102 can be sufficiently protected by the protective layers 103 disposed on both surfaces of the conductive layer 102.

It should be understood that the protective layers 103 disposed on both surfaces of the conductive layer 102 can be made of the same material or different materials, and have the same or different thickness.

In some embodiments, preferably, the protective layer 103 has a thickness $D_3$ satisfying 1 nm≤$D_3$≤200 nm and $D_3$≤0.1 $D_1$. For example, the thickness $D_3$ of the protective layer 103 can be 200 nm or less, 180 nm or less, 150 nm or less, 120 nm or less, 100 nm or less, 80 nm or less, 60 nm or less, 55 nm or less, 50 nm or less, 45 nm or less, 40 nm or less, 30 nm or less, or 20 nm or less, and the thickness $D_3$ of the protective layer 103 can be 1 nm or more, 2 nm or more, 5 nm or more, 8 nm or more, 10 nm or more, 12 nm or more, 15 nm or more, or 18 nm or more. Preferably, the thickness $D_3$ of the protective layer 103 satisfies 5 nm≤$D_3$≤200 nm, and more preferably 10 nm≤$D_3$≤200 nm.

The protective layer 103 having the above thickness is suitable to provide the conductive layer 102 with sufficient protective effect and also ensure that the electrochemical device has a high energy density.

Further, when both surfaces of the conductive layer 102 are provided with the upper and lower protective layers respectively, the upper protective layer has a thickness $D_a$ satisfying 1 nm≤$D_a$≤200 nm and $D_a$≤0.1 $D_1$; and the lower protective layer has a thickness $D_b$ satisfying 1 nm≤$D_b$≤200 nm and $D_b$≤0.1 $D_1$. Preferably, $D_a$>$D_b$ facilitates the protective layer 103 to protect the conductive layer 102 from chemical corrosion and mechanical damage and enables the electrochemical device to have a high weight energy density. More preferably, when 0.5 $D_a$≤$D_b$≤0.8 $D_a$, the protective layer 103 can exert its functions well while minimizing the weight of the negative current collector 10 as much as possible.

The conductive layer can be formed on the support layer by at least one method of mechanical rolling, bonding, vapor deposition, electroless plating, or electroplating, preferably by vapor deposition or electroplating. That is to say, the conductive layer is preferably a vapor deposited layer or a plated layer, thereby achieving a tighter bonding between the conductive layer and the support layer.

For example, when the conductive layer is formed on the support layer by the vapor deposition method, the bonding force between the conductive layer and the support layer is relatively high, which is favorable for improving the mechanical stability, operation stability and service life of the negative current collector. By appropriately adjusting conditions of the vapor deposition process, such as deposition temperature, deposition rate, atmosphere condition of a deposition chamber, and the like, the conductive layer can have a lower sheet resistance growth rate when the negative current collector has a tensile strain of 1.5%, thereby improving the electrochemical performance of the negative current collector.

The vapor deposition method is preferably a physical vapor deposition. The physical vapor deposition method is at least one of evaporation method and sputtering method. The evaporation method is at least one of vacuum evaporating, thermal evaporation deposition, and electron beam evaporation method. The sputtering method is magnetron sputtering.

As an example, the conductive layer is formed by vacuum evaporation comprising the steps of placing a surface-cleaned support layer in a vacuum plating chamber, evaporating a high-purity metal wire in a metal evaporating chamber at a high temperature of 1300° C. to 2000° C., and depositing the evaporated metal on the support layer through the cooling system in the vacuum plating chamber, thereby forming a conductive layer.

The protective layer can be formed on the conductive layer by at least one of vapor deposition method, in-situ formation method, or coating method. The vapor deposition method can be the vapor deposition method as described above. The in-situ formation method is preferably an in-situ passivation method, i.e., a method by which a metal oxide passivation layer is formed in situ on a metal surface. The coating method is preferably at least one of roll coating, extrusion coating, blade coating, or gravure coating.

Preferably, the protective layer is formed on the conductive layer by at least one of the vapor deposition method and the in-situ formation method, thereby increasing the bonding force between the conductive layer and the protective layer. Therefore, the protective layer can better protect the negative current collector and guarantee the working performance of the negative current collector.

When the protective layer (the lower protective layer) is disposed between the conductive layer and the support layer, such a structure may be formed by firstly forming the lower protective layer on the support layer, and forming the conductive layer on the lower protective layer. The lower protective layer can be formed on the support layer by at least one of the vapor deposition method and the coating method, and the vapor deposition method is preferred, which is conducive to increasing the bonding force between the lower protective layer and the support layer. The conductive layer can be formed on the lower protective layer by at least one of the mechanical rolling, bonding, vapor deposition, electroless plating, or electroplating, and the vapor deposition method and electroplating are preferred, which is conducive to increasing the bonding force between the lower protective layer and the conductive layer. The vapor deposition method and the coating method are the vapor deposition method and coating method as described above.

In some embodiments, the bonding force $F_1$ between the conductive layer and the protective layer satisfies $F_1 \geq 100$ N/m, and more preferably $F_1 \geq 400$ N/m.

When the protective layer is also connected to the support layer, the bonding force $F_2$ between the protective layer and the support layer satisfies $F_2 \geq 100$ N/m, and more preferably $F_2 \geq 400$ N/m.

The bonding force $F_1$ between the conductive layer and the protective layer and the bonding force $F_2$ between the protective layer and the support layer can be measured by the same method for measuring the bonding force F between the support layer and the conductive layer.

Negative Electrode Plate

A second aspect of the present disclosure provides a negative electrode plate including a negative current collector and a negative active material layer that are stacked wherein the negative current collector is any negative current collector according to the first aspect of the present disclosure.

The negative electrode plate according to the present disclosure, comprising the negative current collector according to the first aspect of the present disclosure, has higher weight energy density and good overall electrochemical performance than the conventional negative electrode plate.

Figure 10:
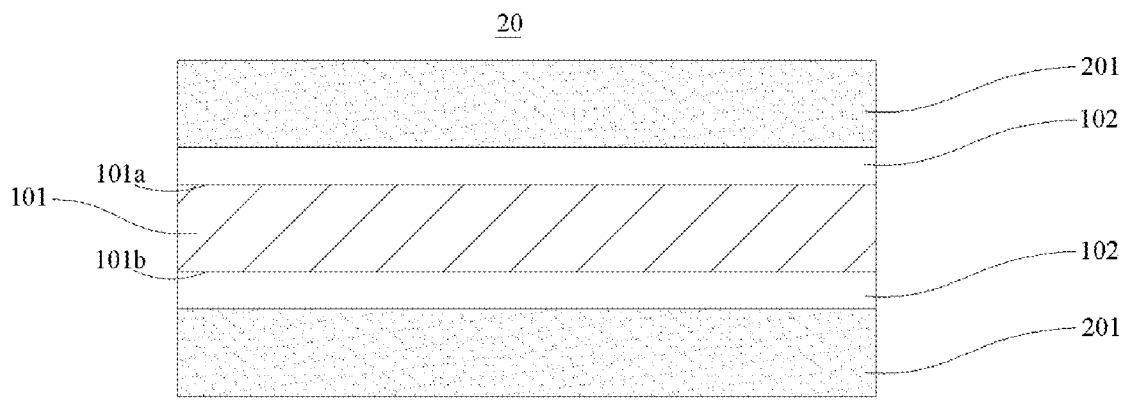
FIG. 10 is a structural schematic diagram of a negative electrode plate according to an embodiment of the present disclosure.

FIG. 10 illustrates an example of a negative electrode plate 20. As shown in FIG. 10, the negative electrode plate 20 includes the negative current collector 10 and negative active material layers 201 that are stacked. The support layer 101 of the negative current collector 10 has two opposite surfaces in the thickness direction thereof, and the conductive layers 102 are laminated on the two surfaces of the support layer 101. The negative active material layers 201 are laminated on the surfaces of the conductive layers 102 of the negative current collector 10 facing away from the support layer 101.

Figure 11:
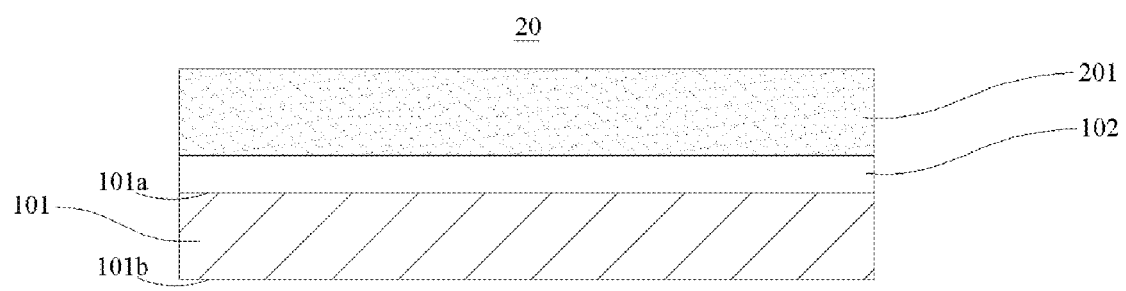
FIG. 11 is a structural schematic diagram of a negative electrode plate according to another embodiment of the present disclosure.

FIG. 11 illustrates another example of a negative electrode plate 20. As shown in FIG. 11, the negative electrode plate 20 includes the negative current collector 10 and a negative active material layer 201 that are stacked. The support layer 101 of the negative current collector 10 has two opposite surfaces in the thickness direction thereof, and the conductive layer 102 is laminated on either one of the two surfaces of the support layer 101. The negative active material layer 201 is laminated on a surface of the conductive layer 102 facing away from the support layer 101.

The negative active material layer 201 includes a negative active material. The negative active material can be any negative active material known in the related art, which is capable of carrying out reversible intercalation/de-intercalation of ions. For example, the negative active material for a lithium ion secondary battery can comprise one or more of lithium metal, natural graphite, artificial graphite, mesophase carbon microbead (abbreviated as MCMB), hard carbon, soft carbon, silicon, silicon-carbon composite, SiO, Li—Sn alloy, Li—Sn—O alloy, Sn, SnO, $SnO_2$, spinel-structured lithium titanate and Li—Al alloy.

In some embodiments, the negative active material layer 201 can further include a conductive agent. As examples, the conductive agent may include one or more of graphite, superconductive carbon, acetylene black, carbon black, ketjen black, carbon dots, carbon nanotubes, graphene, and carbon nanofiber.

In some embodiments, the negative active material layer 201 can further include a binder. As examples, the binder may include one or more of styrene butadiene rubber (SBR), water-based acrylic resin, polyvinylidene fluoride (PVDF), polytetrafluoroethylene (PTFE), ethylene-vinyl acetate copolymer (EVA), polyvinyl alcohol (PVA), and polyvinyl butyral (PVB).

In some embodiments, the negative active material layer 201 can further include a thickener. The thickener may include carboxymethyl cellulose sodium (CMC-Na).

The negative electrode plate can be prepared according to conventional methods known in the related art. The negative active material, as well as optional conductive agent, binder and thickener are usually dispersed in a solvent, wherein the solvent can be NMP or deionized water, to form uniform negative slurry, and the negative slurry is then coated on the negative current collector. After the drying and the like, a negative electrode plate is obtained.

Electrochemical Device

A third aspect of the present disclosure provides an electrochemical device, and the electrochemical device includes a positive electrode plate, a negative electrode plate, and an electrolyte wherein the negative electrode plate is the negative electrode plate according to the second aspect of the present disclosure.

Examples of the electrochemical device can be a battery, a battery module including the battery, or a battery pack including the battery. Examples of the battery can be a primary battery, a secondary battery, or the like. Particular examples of the battery include, but are not limited to, a lithium ion secondary battery, a lithium primary battery, a sodium ion battery, a magnesium ion battery, or the like.

The electrochemical device, which employs the negative electrode plate according to the second aspect of the present disclosure, has higher weight energy density and good overall electrochemical performance.

In some embodiments, the positive electrode plate can include a positive current collector and a positive active material layer disposed on the positive current collector. For example, the positive current collector has two surfaces that are opposite in a thickness direction thereof, and the positive active material layer is laminated on any one or both of the two opposite surfaces of the positive current collector.

In some embodiments, the positive current collector can be selected from a metal foil, a carbon coated metal foil, or a porous metal foil. The positive current collector may include one or more of aluminum, aluminum alloy, copper, copper alloy, nickel, nickel alloy, titanium, titanium alloy, silver, or silver alloy.

The positive active material layer includes a positive active material. The positive active material can be any positive electrode active materials known in the related art, which is capable of carrying out reversible intercalation/deintercalation of ions. For example, the positive active material for the lithium ion secondary battery may include a lithium transition metal composite oxide, and the transition metal can be one or more of Mn, Fe, Ni, Co, Cr, Ti, Zn, V, Al, Zr, Ce, and Mg. The lithium transition metal composite oxide may also be doped with an element having large electronegativity, such as one or more of S, F, Cl, and I, which enables the positive active material to have high structural stability and electrochemical performance.

For example, the positive active material may include one or more o of $LiMn_2O_4$, $LiNiO_2$, $LiCoO_2$, $LiNi_{1-y}Co_yO_2$ (0<y<1), $LiNi_aCo_bAl_{1-a-b}O_2$ (0<a<1, 0<b≤1, 0<a+b<1), $LiMn_{1-m-n}Ni_mCO_nO_2$ (0<m<1, 0<n<1, 0<m+n<1), $LiMPO_4$ (M can be one or more of Fe, Mn, or Co), and $Li_3V_2(PO_4)_3$.

In some embodiments, the positive active material layer can further include a binder. As examples, the binder may comprise one or more of styrene butadiene rubber (SBR), water-based acrylic resin, carboxymethyl cellulose sodium (CMC-Na), polyvinylidene fluoride (PVDF), polytetrafluoroethylene (PTFE), ethylene-vinyl acetate copolymer (EVA), polyvinyl alcohol (PVA), and polyvinyl butyral (PVB).

In some embodiments, the positive active material layer can further include a conductive agent. As examples, the conductive agent may comprise one or more of graphite, superconductive carbon, acetylene black, carbon black, ketjen black, carbon dots, carbon nanotubes, graphene, and carbon nanofiber.

The positive electrode plate can be prepared according to conventional methods known in the related art. The positive electrode active material, as well as optional conductive agent and binder are usually dispersed in a solvent such as N-methylpyrrolidone (abbreviated as NMP) to form a uniform positive slurry, and the positive slurry is then coated on the positive current collector. After the drying and the like, a positive electrode plate is obtained.

In some embodiments, the electrolyte may be a solid electrolyte or a non-aqueous electrolytic solution. The electrolytic solution includes an organic solvent and an electrolyte salt. The organic solvent, as a medium for transporting ions in an electrochemical reaction, can be any organic solvent known in the related art for the electrolytic solution of the electrochemical device. The electrolytic salt serves as a source of ions, and can be any electrolyte salt known in the related art for the electrolytic solution of the electrochemical device.

For example, the organic solvent of the lithium ion secondary battery can be one or more of, preferably two or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), methyl ethyl sulfone (EMS), and diethyl ether (ESE).

For example, the electrolyte salt of the lithium ion secondary battery can comprise one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonylimide), LiTFSI (lithium bis(trifluorosulfonyl)imide), LiTFS (lithium trifluoromethanesulfonate), LiDFOB (lithium difluoro(oxalate)borate), LiBOB (lithium bis(oxalate)borate), $LiPO_2F_2$ (lithium difluorophosphate), LiDFOP (lithium difluorodi(oxalate) phosphate), and LiTFOP (lithium tetrafluorooxalate phosphate).

The electrolytic solution may further include an additive. There is no particular limitation to the specific types of the additive, which may be selected according to requirements. For example, the additive may include a negative electrode film-forming additive, and may also include a positive electrode film-forming additive, and may also include additives capable of improving certain performances of the electrochemical device, such as additives for improving an overcharge performance of the electrochemical device, additives for improving a high-temperature performance of the electrochemical device, additives for improving a low temperature performance of the electrochemical device and the like.

When the electrolytic solution is used in the electrochemical device, a separator is provided between the positive electrode plate and the negative electrode plate for isolation. There is no particular limitation to the separator is not particularly limited, which can be any porous separator having chemical stability and mechanical stability known in the related art. The separator may be a single-layered or multi-layered film including one or more of glass fiber, non-woven fabric, polyethylene, polypropylene, and polyvinylidene fluoride.

In some embodiments, the electrochemical device may be a battery. The battery may include an outer package for encapsulating the positive electrode plate, the negative electrode plate, and the electrolyte. As an example, the positive electrode plate, the negative electrode plate, and the separator may be stacked or wound to form an electrode assembly having a stacked structure or an electrode assembly having a wound structure (also referred to as a battery core), and the electrode assembly is encapsulated in the outer package. The electrolyte may be an electrolytic solution, and the electrolytic solution is impregnated in the electrode assembly. There may be one or more electrode assemblies provided in the battery, which can be adjusted according to requirements.

In some embodiments, the outer package of the battery may be a soft package, such as a pouch. The material of the soft package may be plastic, such as one or more of polypropylene PP, polybutylene terephthalate PBT, polybutylene succinate PBS, and the like. The outer package of the battery may also be a hard package, such as an aluminum casing.

Figure 12:
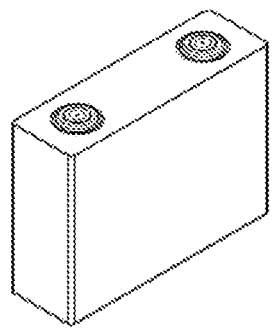
FIG. 12 is a schematic diagram of a secondary battery according to an embodiment of the present disclosure.

There is no particular limitation to the shape of the battery in the present disclosure, which may be cylindrical, square, or any other shape. FIG. 12 illustrates a battery 5 having a rectangular structure as an example.

In some embodiments, the battery can be assembled into a battery module. Multiple batteries may be included in the battery module, and the specific number can be adjusted according to the application and capacity of the battery module.

Figure 13:
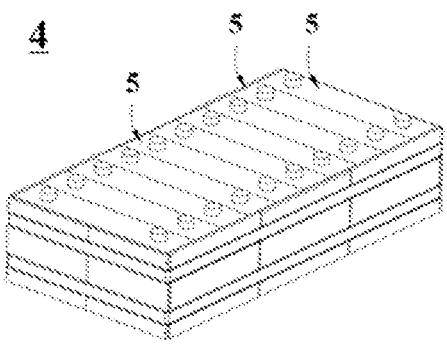
FIG. 13 is a schematic diagram of a battery module according to an embodiment of the present disclosure.

FIG. 13 illustrates a battery module 4 as an example. Referring to FIG. 13, in the battery module 4, a plurality of batteries 5 are sequentially arranged along a length direction of the battery module 4. It is also possible that a plurality of batteries 5 are arranged in any other manner. Further, a plurality of batteries 5 can be fixed by a fastener.

The battery module 4 may further include a casing having a receiving space, in which a plurality of batteries 5 are received.

In some embodiments, the above battery module can also be assembled into a battery pack, and the number of battery modules included in the battery pack can be adjusted according to the application and capacity of the battery pack.

Figure 14:
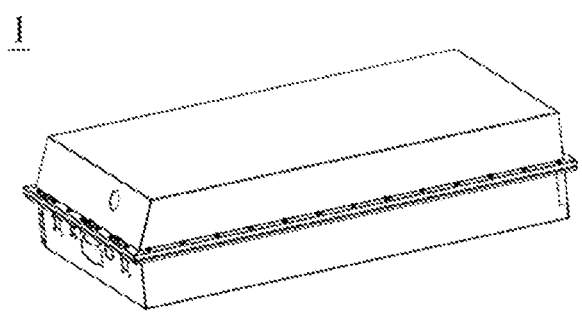
FIG. 14 is a schematic diagram of a battery pack according to an embodiment of the present disclosure.
Figure 15:
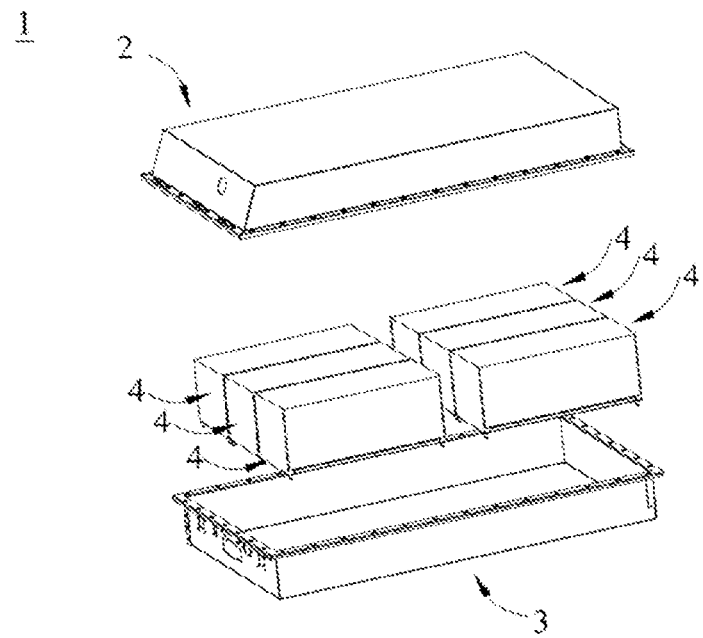
FIG. 15 is an exploded view of FIG. 14.

FIG. 14 and FIG. 15 illustrate a battery pack 1 as an example. With reference to FIG. 14 and FIG. 15, the battery pack 1 may include a battery box and a plurality of battery modules 4 provided in the battery box. The battery box includes an upper box 2 and a lower box 3 and the upper box 2 is arranged to cover the lower box 3, so as to form a closed space for receiving the battery modules 4. A plurality of battery modules 4 can be arranged in the battery box in any manner.

Apparatus

The fourth aspect of the present disclosure provides an apparatus including the electrochemical device according to the third aspect of the present disclosure. The electrochemical device may be used as a power source of the apparatus or as an energy storage unit of the apparatus. The apparatus may be, but not limited to, a mobile apparatus (such as a mobile phone, a notebook computer, etc.), an electric vehicle (such as a pure electric vehicle, a hybrid electric vehicle, a plug-in hybrid electric vehicle, an electric bicycle, an electric scooter, an electric golf vehicles, electric trucks and the like), electric trains, ships and satellites, energy storage systems, or the like. The apparatus can adopt different electrochemical devices, such as a battery, a battery module, or a battery pack, depending on application requirements.

Figure 16:
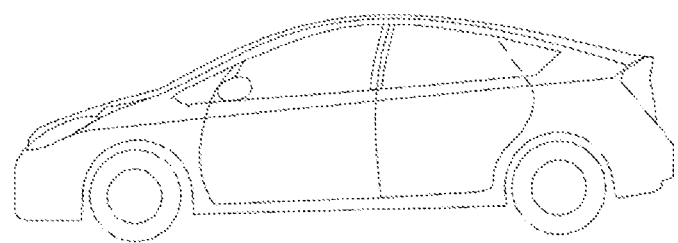
FIG. 16 is a schematic diagram of an apparatus according to an embodiment of the present disclosure.

FIG. 16 illustrates an apparatus as an example. The apparatus is a pure electric vehicle, a hybrid electric vehicle, or a plug-in hybrid electric vehicle. In order to meet the requirements of the apparatus on high power and high energy density of the electrochemical device, a battery pack or a battery module can be used.

As another example, the apparatus may be a mobile phone, a tablet computer, a notebook computer, and the like. The apparatus is generally required to be thin and light, and a secondary battery can be used as a power source.

EXAMPLES

The following examples are intended to describe the present disclosure more specifically, merely for the purpose of illustration. Various modifications and variations within the scope of the present disclosure are apparent to those skilled in the related art. The parts, percentages, and ratios mentioned in the following examples are accounted by weight unless otherwise stated, all reagents used in the examples are commercially available or can be directly synthesized according to conventional method without further processing, and the instruments used in the examples are also commercially available.

Preparation Methods

Preparation of Negative Current Collector

A support layer having a predetermined thickness was selected and subjected to surface cleaning treatment, the surface-cleaned support layer was placed in a vacuum plating chamber, a high-purity copper wire was molten and evaporated in a metal evaporation chamber at high temperature of 1300° C. to 2000° C., and the evaporated metal was deposited on two surfaces of the support layer through a cooling system in the vacuum plating chamber, thereby forming a conductive layer.

Preparation of Negative Electrode Plate

Graphite as negative active material, conductive carbon black, carboxymethyl cellulose sodium (CMC-Na) as thickener, and styrene-butadiene rubber emulsion (SBR) as binder were mixed in deionized water in a weight ratio of 96.5:1.0:1.0:1.5 and the mixture was thoroughly stirred to form a uniform negative slurry. The negative slurry was then coated on a negative current collector followed by drying, thereby obtaining a negative electrode plate.

Preparation of Conventional Negative Electrode Plate

The preparation of the conventional negative electrode plate differs from that of the negative electrode plate according to the present disclosure in that a copper foil having a thickness of 8 μm was used as a negative current collector.

Preparation of Positive Electrode Plate

An aluminum foil having a thickness of 12 μm was used.

Preparation of Conventional Positive Electrode Plate $LiNi_{1/3}Co_{1/3}Mn_{1/3}O_2$ (NCM333) as positive electrode active material, conductive carbon black, and polyvinylidene fluoride (PVDF) as binder were mixed in N-methylpyrrolidone (NMP) in a weight ratio of 93:2:5 and the mixture was thoroughly stirred to form a uniform positive slurry. The positive slurry was then coated on a positive current collector followed by drying, thereby obtaining a positive electrode plate.

Preparation of Electrolytic Solution

Ethylene carbonate (EC) and ethyl methyl carbonate (EMC) were uniformly mixed in a volume ratio of 3:7 to obtain an organic solvent, and then 1 mol/L of $LiPF_6$ was uniformly dissolved in the above organic solvent.

Preparation of Lithium Ion Secondary Battery

The positive electrode plate, the separator, and the negative electrode plate were sequentially stacked and then wound into a battery core, and the battery core was placed into an outer package. The separator was a PP/PE/PP composite film, which was disposed between the positive electrode plate and the negative electrode plate for isolation. The electrolytic solution was injected into the battery cell, and then a lithium ion secondary battery was obtained after subjected to sealing, standing, hot-cold rolling, formation, and the like.

Tests

1. Tests for Negative Current Collector

The volume resistivity of the support layer, the sheet resistance growth rate T of the conductive layer when the negative current collector had a tensile strain of 1.5%, the Young's modulus E of the support layer were tested by the test methods described above, respectively.

2. Performance Tests for Battery (1) Cycle Performance Test

At 45° C., the lithium ion secondary battery was charged at a constant current rate of 1 C to 4.2 V, then charged at a constant voltage until the current was 0.05 C or less, and then discharged at a constant current rate of 1 C to 2.8 V, which was taken as one charge and discharge cycle. The discharge capacity in this cycle was a discharge capacity for the $1^{st}$ cycle. The battery was subjected to 1000 charge and discharge cycles as described above, and the discharge capacity for the $1000^{th}$ cycle was recorded.

Capacity retention ratio (%) of lithium ion secondary battery after 1000 1 C/1 C cycles=(discharge capacity for the $1000^{th}$ cycle/discharge capacity for the $1^{st}$ cycle)×100%.

(2) Rate Performance Test

The lithium ion secondary battery was charged to 4.2 V at a constant current rate of 1 C at 25° C., then charged at a constant voltage until the current was 0.05 C or less, and then discharged at a constant current rate of 1 C to 3.0 V, to determine the discharge capacity of the lithium ion secondary battery at 1 C rate.

The lithium ion secondary battery was charged at a constant current rate of 1 C to 4.2 V at 25° C., then charged at a constant voltage until the current was 0.05 C or less, and then discharged at a constant current of 4 C to 3.0 V, to determine the discharge capacity of the lithium ion secondary battery at 4 C rate.

Capacity retention ratio (%) of lithium ion secondary battery at 4 C rate=(discharge capacity at 4 C rate/discharge capacity at 1 C rate)×100%.

Test Results le;2q1. Effects of the Negative Current Collector According to the Present Disclosure on Improving Weight Energy Density of Electrochemical Device

TABLE 1

| Negative current collector No. | Support layer Material | $D_2$ (μm) | Conductive layer Material | $D_1$ (μm) | Thickness of negative current collector (μm) | Weight percentage of negative current collector (%) |
|---|---|---|---|---|---|---|
| Negative current collector 1 | PET | 5 | Cu | 0.5 | 6 | 21.6 |
| Negative current collector 2 | PI | 2 | Cu | 0.8 | 3.6 | 23.8 |
| Negative current collector 3 | PET | 8 | Cu | 1 | 10 | 39.6 |
| Negative current collector 4 | PET | 6 | Cu | 1.5 | 9 | 48.5 |
| Negative current collector 5 | PET | 4 | Cu | 1.2 | 6.4 | 37.3 |
| Negative current collector 6 | PET | 10 | Cu | 0.2 | 10.4 | 23.3 |
| Negative current collector 7 | PI | 8 | Cu | 2 | 12 | 65.3 |
| Conventional negative current collector | / | / | Cu | / | 8 | 100 |

In Table 1, the weight percentage of the negative current collector is the ratio of the weight per unit area of the negative current collector to the weight per unit area of the conventional negative current collector.

Compared with the conventional copper foil negative current collector, all negative current collectors according to the present disclosure had reduced weight to different extents, thereby increasing the weight energy density of the battery.

2. Effects of the Negative Current Collector According to the Present Disclosure on Electrochemical Performance of an Electrochemical Device

TABLE 2

| Negative current collector No. | Upper protective layer Material | $D_a$ (nm) | Lower protective layer Material | $D_b$ (nm) |
|---|---|---|---|---|
| Negative current collector 4-1 | / | / | Nickel | 1 |
| Negative current collector 4-2 | / | / | Nickel | 10 |
| Negative current collector 4-3 | / | / | Nickel-based alloy | 50 |

TABLE 2-continued

| Negative current collector No. | Upper protective layer Material | $D_a$ (nm) | Lower protective layer Material | $D_b$ (nm) |
|---|---|---|---|---|
| Negative current collector 4-4 | / | / | Nickel | 150 |
| Negative current collector 4-5 | Nickel | 5 | / | / |
| Negative current collector 4-6 | Nickel-based alloy | 100 | / | / |
| Negative current collector 4-7 | Nickel | 10 | Nickel | 5 |
| Negative current collector 4-8 | Nickel | 10 | Nickel | 10 |
| Negative current collector 4-9 | Nickel | 50 | Nickel | 50 |
| Negative current collector 4-10 | Nickel | 100 | Nickel | 50 |
| Negative current collector 4-11 | Nickel | 150 | Nickel | 75 |

The negative current collectors in Table 2 are those provided with the protective layer on the negative current collector 4.

TABLE 3

| Battery No. | Negative electrode plate No. | Negative current collector No. | Positive electrode plate |
|---|---|---|---|
| Battery 1 | Negative electrode plate 4 | Negative current collector 4 | Conventional positive electrode plate |
| Battery 2 | Negative electrode plate 4-1 | Negative current collector 4-1 | Conventional positive electrode plate |
| Battery 3 | Negative electrode plate 4-2 | Negative current collector 4-2 | Conventional positive electrode plate |
| Battery 4 | Negative electrode plate 4-3 | Negative current collector 4-3 | Conventional positive electrode plate |
| Battery 5 | Negative electrode plate 4-4 | Negative current collector 4-4 | Conventional positive electrode plate |
| Battery 6 | Negative electrode plate 4-5 | Negative current collector 4-5 | Conventional positive electrode plate |
| Battery 7 | Negative electrode plate 4-6 | Negative current collector 4-6 | Conventional positive electrode plate |
| Battery 8 | Negative electrode plate 4-7 | Negative current collector 4-7 | Conventional positive electrode plate |
| Battery 9 | Negative electrode plate 4-8 | Negative current collector 4-8 | Conventional positive electrode plate |
| Battery 10 | Negative electrode plate 4-9 | Negative current collector 4-9 | Conventional positive electrode plate |
| Battery 11 | Negative electrode plate 4-10 | Negative current collector 4-10 | Conventional positive electrode plate |
| Battery 12 | Negative electrode plate 4-11 | Negative current collector 4-11 | Conventional positive electrode plate |
| Battery 13 | Conventional negative electrode plate | Conventional negative current collector | Conventional positive electrode plate |

TABLE 4

| Battery No. | Capacity retention ratio after 1000 1C/1C cycles @45° C. (%) | Capacity retention at 4C rate (%) |
|---|---|---|
| Battery 1 | 86.3 | 46.8 |
| Battery 2 | 86.3 | 46.5 |
| Battery 3 | 86.7 | 46.6 |
| Battery 4 | 86.5 | 46.0 |
| Battery 5 | 87.1 | 47.4 |
| Battery 6 | 86.5 | 46.4 |
| Battery 7 | 86.7 | 46.1 |
| Battery 8 | 87.2 | 47.3 |
| Battery 9 | 87.6 | 47.5 |
| Battery 10 | 87.8 | 47.7 |
| Battery 11 | 88.0 | 48.1 |
| Battery 12 | 88.3 | 48.6 |
| Battery 13 | 86.7 | 47.9 |

It was shown from Table 4 that the cycle life and rate performance of each battery comprising the negative current collector according to the present disclosure were good, which are comparable to the cycle performance and rate performance of the batteries comprising the conventional negative current collectors, indicating that the negative current collector according to the present disclosure had no significant adverse effect on the electrochemical performance of the negative electrode plate and the battery. In the batteries comprising the negative current collector provided with the protective layer, the capacity retention ratio after 1000 1 C/1 C cycles at 45° C. and the capacity retention ratio at 4 C rate were further improved, indicating that the battery had higher reliability.

3. Effects of Tensile Resistance Growth Rate of the Negative Current Collector on the Electrochemical Device

TABLE 5

| Negative current collector No. | Conductive layer Material | $D_1$ (μm) | T (%) | Support layer Material | $D_2$ (μm) | Volume resistivity (Ω·m) | E (GPa) |
|---|---|---|---|---|---|---|---|
| Negative current collector 31 | Cu | 0.3 | 5.0 | PET | 8 | $2.1 \times 10^{14}$ | 4.1 |
| Negative current collector 32 | Cu | 0.3 | 3.9 | PET | 8 | $2.1 \times 10^{14}$ | 4.1 |
| Negative current collector 33 | Cu | 0.5 | 2.5 | PET | 8 | $2.1 \times 10^{14}$ | 4.1 |

TABLE 5-continued

| | Conductive layer | | | Support layer | | |
|---|---|---|---|---|---|---|
| Negative current collector No. | Material | $D_1$ (μm) | T (%) | Material | $D_2$ (μm) | Volume resistivity (Ω·m) | E (GPa) |
| Negative current collector 34 | Cu | 0.7 | 1.3 | PET | 8 | $2.1 \times 10^{14}$ | 4.1 |
| Negative current collector 35 | Cu | 0.9 | 0.7 | PET | 8 | $2.1 \times 10^{14}$ | 4.1 |
| Negative current collector 36 | Cu | 1.2 | 0 | PET | 8 | $2.1 \times 10^{14}$ | 4.1 |
| Negative current collector 37 | Copper alloy | 1.0 | 0 | PET | 8 | $2.1 \times 10^{14}$ | 4.1 |
| Comparative negative current collector | Cu | 1.0 | 6 | PET | 8 | $2.1 \times 10^{14}$ | 4.1 |

In above Table 5, the copper alloy had a composition of 95 wt % of copper and 5 wt % of nickel.

The positive current collectors in Table 5 were subjected to an overcurrent test. The overcurrent test was performed as follows: cutting the positive current collector into a width of 100 mm, coating an active material layer having a width of 80 mm at a center position in width direction, and rolling the active material layer to form an electrode plate. The rolled electrode plate was cut into five strips of 100 mm×30 mm along the width direction. During the test, the conductive regions without the coating on both sides of the electrode plate sample were connected to positive and negative electrodes of a charging and discharging machine respectively, and then the electrode plate was subjected to 10 A current by setting the charging and discharging machine. If the electrode plate was not melting broken after 1 hour, the electrode plate was considered as passing the test, otherwise as failure. Five samples were tested for each set of samples, and the test results were shown in Table 6.

TABLE 6

| Negative electrode plate No. | Negative current collector No. | Results of overcurrent test |
|---|---|---|
| Negative electrode plate 31 | Negative current collector 31 | 2/5 |
| Negative electrode plate 32 | Negative current collector 32 | 4/5 |
| Negative electrode plate 33 | Negative current collector 33 | 5/5 |
| Negative electrode plate 34 | Negative current collector 34 | 5/5 |
| Negative electrode plate 35 | Negative current collector 35 | 5/5 |
| Negative electrode plate 36 | Negative current collector 36 | 5/5 |
| Negative electrode plate 37 | Negative current collector 37 | 5/5 |
| Comparative negative electrode plate | Comparative negative current collector | 0/5 |

It was shown from Table 5 and Table 6 that the conductive layer had a sheet resistance growth rate T of not more than 5% when the negative current collector had a tensile strain of 1.5%. In this case, the negative electrode plate comprising the negative current collector could have better electrical conductivity after rolling. Otherwise, the negative electrode plate would have poor conductivity, and the related battery product would be useless. Preferably, the conductive layer had a sheet resistance growth rate T of ≤2.5% when the negative current collector had a tensile strain of 1.5%.

The above describes merely specific embodiments of the present disclosure, but is not intended to limit the protection scope of the present disclosure. Various equivalent variations or replacements obtained by those skilled in the related art within the scope of present disclosure shall fall within the protection scope of the present application. The protection scope of the present disclosure shall be defined by the claims.

What is claimed is:

1. A negative current collector, comprising:
   a support layer; and
   a conductive layer disposed on at least one of two opposite surfaces of the support layer in a thickness direction of the support layer,
   wherein
   the support layer has a smaller density than the conductive layer,
   the conductive layer has a thickness $D_1$ satisfying 300 nm≤$D_1$≤2 μm, and
   when the negative current collector has a tensile strain of 1.5%, the conductive layer has a sheet resistance growth rate T satisfying T≤2.5%;
   the conductive layer comprises copper, or copper alloy; and
   the support layer comprises polyethylene terephthalate, wherein the support layer has a thickness $D_2$ satisfying 2 μm≤$D_2$≤10 μm.

2. The negative current collector according to claim 1, wherein the conductive layer has a volume resistivity in a range of $1.3 \times 10^{-8}$ Ω·m to $1.3 \times 10^{-7}$ Ω·m.

3. The negative current collector according to claim 1, further comprising a protective layer, wherein the protective layer is disposed between the conductive layer and the support layer; and/or the protective layer is disposed on the surface of the conductive layer facing away from the support layer.

4. The negative current collector according to claim 3, wherein the protective layer comprises one or more of a metallic material or a metal oxide material.

5. The negative current collector according to claim 3, wherein the protective layer has a thickness $D_3$ satisfying 1 nm≤$D_3$≤200 nm and $D_3$≤$0.1D_1$.

6. The negative current collector according to claim 1, wherein the thickness $D_2$ satisfies 2 μm≤$D_2$≤6 μm.

7. The negative current collector according to claim 1, wherein the support layer further comprises an additive, and the additive comprises one or more of a metallic material and an inorganic non-metallic material.

8. The negative current collector according to claim 1, wherein the support layer has an elongation at break greater than or equal to that of the conductive layer; and/or, the support layer has a Young's modulus E satisfying $E \geq 4$ GPa.

9. The negative current collector according to claim 1, wherein the conductive layer is a vapor deposited layer or an electroplated layer.

10. A negative electrode plate, comprising:

a negative current collector; and a negative active material layer disposed on the negative current collector wherein the negative current collector is the negative current collector according to claim 1.

11. An electrochemical device, comprising:
a positive electrode plate;
a negative electrode plate; and
an electrolyte,
wherein the negative electrode plate is the negative electrode plate according to claim 10.

12. An apparatus, comprising the electrochemical device according to claim 11.

13. The negative current collector according to claim 1 wherein the conductive layer has a thickness $D_1$ satisfying 500 nm $\leq D_1 \leq 1.5$ µm.

14. The negative current collector according to claim 1, wherein the conductive layer has a volume resistivity in a range of $1.3 \times 10^{-8}$ Ω·m to $3.3 \times 10^{-8}$ Ω·m.

15. The negative current collector according to claim 3, wherein the protective layer comprises one or more of nickel, chromium, nickel-based alloy, copper-based alloy, aluminum oxide, cobalt oxide, chromium oxide, or nickel oxide.

* * * * *